United States Patent [19]

Lee

[11] Patent Number: 5,529,347
[45] Date of Patent: Jun. 25, 1996

[54] HYDRAULIC TURNING JOINT

[75] Inventor: Jae-Hoon Lee, Changwon, Rep. of Korea

[73] Assignee: Samsung Heavy Industry Co., Ltd., Rep. of Korea

[21] Appl. No.: 323,752

[22] Filed: Oct. 17, 1994

[51] Int. Cl.⁶ .................................................. F16L 39/04
[52] U.S. Cl. .......................................... 285/136; 285/190
[58] Field of Search ..................................... 285/134, 136, 285/190

[56] References Cited

U.S. PATENT DOCUMENTS

| | | | |
|---|---|---|---|
| 2,187,147 | 1/1940 | Englesson | 285/136 |
| 2,768,843 | 10/1956 | Zeilman | 285/136 X |
| 2,820,650 | 1/1958 | Leopold | 285/134 |
| 4,558,890 | 12/1985 | Schartz | 285/136 X |
| 4,928,997 | 5/1990 | Reisener et al. | 285/136 X |

FOREIGN PATENT DOCUMENTS 2229784  10/1990  United Kingdom ................... 285/136

*Primary Examiner*—Dave W. Arola
*Attorney, Agent, or Firm*—Lieberman & Nowak

[57] ABSTRACT

Disclosed is a hydraulic turning joint which has substantially reduced longitudinal length with an equal number of oil passages therein and can reduce the mounting space in the equipment and which improves the work efficiency, accuracy and reliance of the product. The hydraulic turning joint includes a shaft, a housing for rotatably and closely accommodating the shaft, at least one oil supply passage formed in the shaft, said oil supply passage longitudinally passing through the shaft, and at least one oil discharge passage formed on the top of the the housing, said oil discharge passage being correspondingly communicated with at least one oil supply passage, wherein each of said oil supply passages are transversely communicated with each of said oil discharge passages on the same plane. The hydraulic turning joint further includes sealing means installed between the oil discharge passages within the housing.

5 Claims, 2 Drawing Sheets

HYDRAULIC TURNING JOINT

BACKGROUND OF THE INVENTION

1. Field of the Invention

The present invention relates to a hydraulic turning joint, and more particularly, to a hydraulic turning joint used for jointing upper and lower frames of equipment such as excavators, cranes, etc., wherein the upper frame is swingably jointed to the lower frame.

2. Description of the Prior Art

In construction equipment such as excavators or cranes, an upper frame is swingably jointed to a lower frame and for this jointing, a hydraulic turning joint is used as a jointing means.

More particularly, the hydraulic turning joint should joint the upper frame and lower frame of equipment such that not only the upper frame can be rotated smoothly relative to the lower frame, but also oil can flow between the upper and bottom frames through the hydraulic turning joint. That is, the hydraulic turning joint should provide an oil passage for the supply of a pressurized oil discharge from a hydraulic pump installed on the lower frame, to an actuator of each working member (in case of the excavator, a boom, an arm, a bucket, etc.) installed on the upper frame.

In a conventional hydraulic turning joint, as shown in FIG. 1, a shaft 102 coupled to a lower frame is rotatably and closely accommodated within a housing 101 coupled to an upper frame. The inside of the shaft 102 is formed with a plurality of oil supply passages 103a~103e, and the housing 101 is formed with a plurality of oil discharge passages 104a~104e, each of which is in communication with each of the above mentioned oil supply passages 103a~103e. Furthermore, sealing slots 105a~105c are formed at various places (between the oil passages) of the inner circumferential surface of the housing 101 to provide a seal, and since the sealing members 106a~106c are mounted in the sealing slots 105a~105c, the sealing action can be performed between each of the adjacent oil passages 104a~104e. By means of the hydraulic turning joint constructed as mentioned above, not only the upper frame can be swingably jointed to the lower frame, but also the oil can flow between the lower frame and the upper frame.

However, conventional hydraulic turning joints as mentioned above have the disadvantages that, as the number of the oil passages in creases, the longitudinal length of the hydraulic turning joint becomes longer than its transverse length. As a result, it is difficult to have enough space for mounting the above mentioned hydraulic turning joint in the equipment.

Further, conventional hydraulic turning joints have another disadvantage that, since the length of the housing is relatively longer than the diameter of the housing 101, the inner circumferential surface of the housing 101 has to be machined from both ends to the central section of the housing 101, rather than be machined at a time through either the top end or the bottom end. This creates a degraded roughnecks on the inner circumferential surface, resulting in increased work time to finish the surface, a reduction in work efficiency and a possible lowering in the reliability of the entire product.

SUMMARY OF THE INVENTION

It is an object of the present invention to provide a hydraulic turning joint which has substantially reduced longitudinal length with an equal number of oil passages therein.

It is another object of the present invention to provide a hydraulic turning joint which can reduce the mounting space in the equipment and which improves the work efficiency, accuracy and reliance of the product.

In accordance with an aspect of the present invention, there is provided a hydraulic turning joint adapted for swingably jointing an upper frame relative to a lower frame and for enabling an oil flow between said upper and lower frames, the hydraulic turning joint comprising: a shaft coupled to said lower frame; a housing coupled to said upper frame, for rotatably and closely accommodating said shaft; a plurality of oil supply passages formed in said shaft, said oil supply passages longitudinally passing through said shaft; and a plurality of oil discharge passages formed on the top of the said housing, said oil discharge passages being correspondingly communicated with said oil supply passages; wherein said oil supply passages are transversely communicated with said oil discharge passages on the same plane.

Further, in accordance with another aspect of the present invention, there is provided a hydraulic turning joint adapted for swingably jointing an upper frame relative to a lower frame and for enabling an oil flow between said upper and lower flames, the hydraulic turning joint comprising: a first turning joint including a first shaft coupled to said upper frame, a first housing coupled to said lower frame, said first housing accommodating said first shaft rotatably and closely, a plurality of first oil supply passages formed in said first housing, and a plurality of first oil discharge passages formed in said first shaft, said first oil supply passages being correspondingly communicated with said first oil discharge passages; and a second turning joint including a second shaft coupled to said first housing and accommodating said first housing closely therein, a second housing coupled to said first shaft and accommodating said second shaft rotatably and closely therein, a plurality of second oil supply passages formed in said second shaft, and a plurality of second oil discharge passages formed in said second housing, said second oil supply passages being correspondingly communicated with said second oil discharge passages.

BRIEF DESCRIPTION OF THE DRAWINGS

FIG. 2 is a schematic view of a preferred embodiment according to the present invention where.

DETAILED DESCRIPTION OF THE PREFERRED EMBODIMENT

Figure 2A:
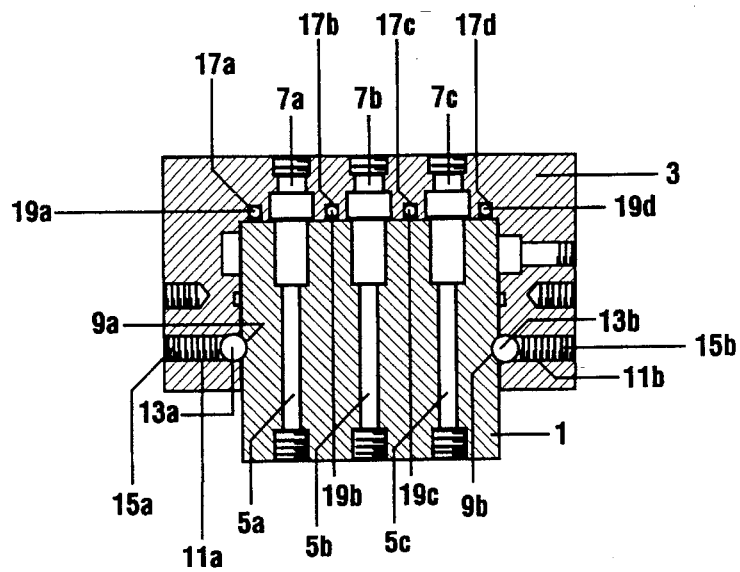
FIG. 2A is a section view.
Figure 2B:
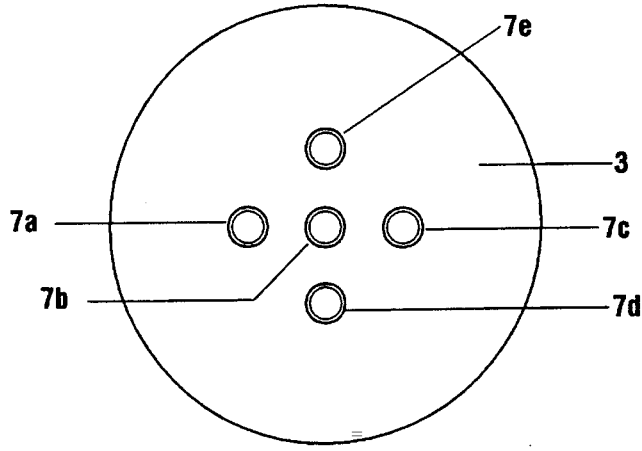
FIG. 2B is a top view and FIG. 2C is a bottom view.
Figure 2C:
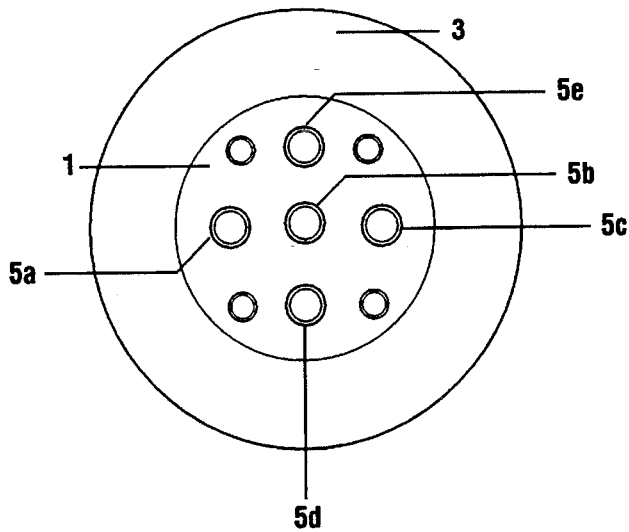

FIG. 2A, 2B and 2C show the hydraulic turning joint of a preferred embodiment of the present invention. Referring to FIG. 2A, 2B and 2C, the shaft 1 coupled to the lower frame (not shown) is rotatably and closely accommodated within the housing 3 coupled to the upper frame (not shown). The shaft 1 is formed with a plurality of oil supply passages 5a~5e inside of it which pass through from the top to the bottom end of the shaft 1, and the housing 3 is formed with a plurality oil discharge passages 7a~7e on its top such that each of the oil discharge passages 7a~7e can be in communication with each top of the above mentioned oil supply passages 5a–5e. Therefore, on the same plane, each of the oil supply passages 5a–5e formed in the shaft 1 can be transversely communicated with each of the oil discharge passages 7a–7e formed on the housing 3.

Also, the grooves 9a and 9b are formed at predetermined positions of the outer circumferential surface of the shaft 1 and the engaging apertures 11a and 11b are formed at predetermined positions on the side of the housing 3, corresponding to the grooves 9a and 9b. By means of the balls 13a and 13b and the bolts 15a and 15b, some parts of the balls 13a and 13b being supported within said grooves 9a and 9b and the other parts thereof being supported within said engaging apertures 11a and 11b, and the bolts 15a and 15b being engaged with the engaging apertures 11a and 11b and supporting the balls 13a and 13b to prevent the balls from separating therefrom, the above mentioned shaft 1 and housing 3 can be jointed together without being separated from each other. Since each of the sealing slots 17a–17d is formed between the adjacent oil passages 7a–7e of the inside of the housing 3, and each of the sealing members 19a–19d are inserted in the sealing slots 17a–17d, the sealing action can be performed between each of the adjacent oil passages.

Also, the sealing slots and the sealing members can be disposed inside the top of the above mentioned shaft 1.

In the hydraulic turning joint of this embodiment constructed as mentioned above, since, on the same plane, the oil supply passages 5a–5e formed in the shaft can be transversely communicated with the oil discharge passages 7a–7e formed on the housing 3, the increase in the number of oil passages does not result in an increase of longitudinal length in the hydraulic turning joint.

Figure 1:
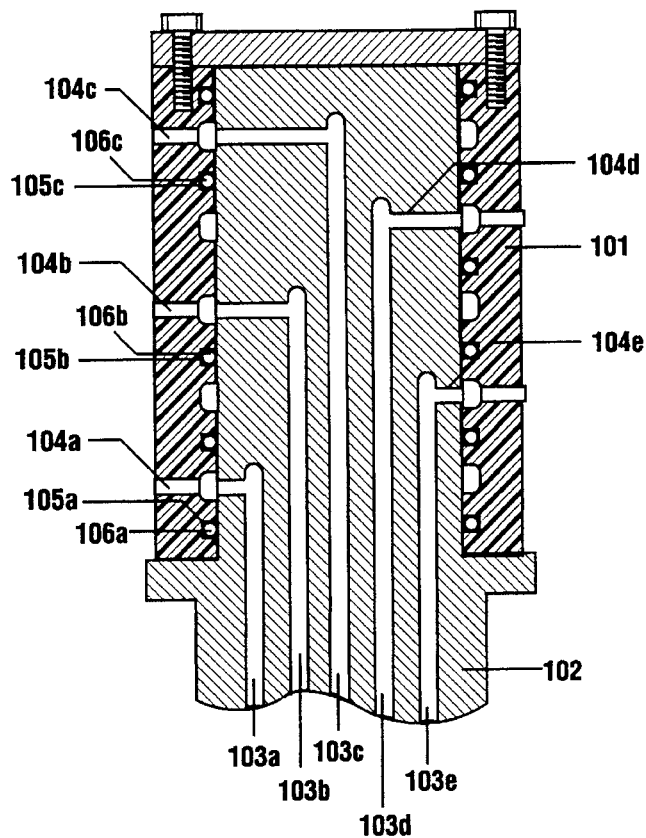
FIG. 1 is a cross-sectional schematic view of a conventional hydraulic turning joint.
Figure 3:
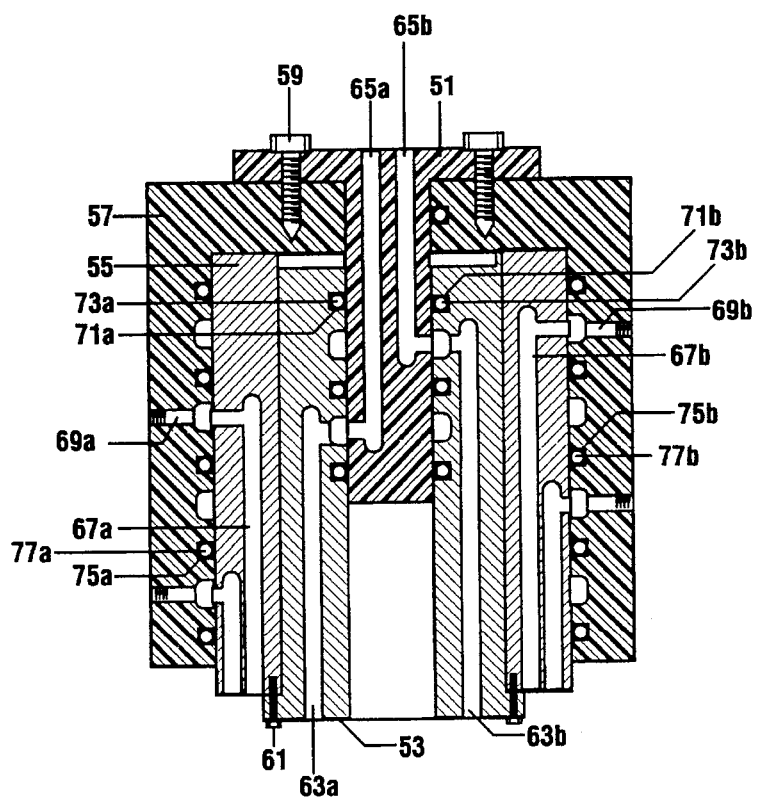
FIG. 3 is a cross-sectional schematic view of another preferred embodiment according to the present invention.

In addition, FIG. 3 shows the hydraulic turning joint according to another embodiment of the present invention. Referring to FIG. 3, a first shaft 51 and a first housing 53 act as one turning joint (the first turning joint), and, a second shaft 55 and a second housing 57 act as the other turning joint (the second turning joint).

That is, the first turning Joint is composed of the first shaft 51, which is coupled to the upper frame (not shown), and the first housing 53, which is coupled to the lower frame (not shown) for rotatably and closely accommodating the first shaft 51. And, the second turning joint is composed of the second shaft 55 and the second housing 57, the second shaft 55 is jointed to the above mentioned first housing 53 by means of bolt 61 and closely accommodating the first housing 53 therein and the second housing 57 is jointed to the above mentioned first shaft 51 by means of a bolt 59 for closely accommodating the second shaft 55 therein.

In the hydraulic turning joint of this embodiment, the first shaft 51, the first housing 53, the second shaft 55 and the second housing 57 are concentrically arranged by turns. The first housing 53 has the first oil supply passages 63a and 63b formed inside of it. Each of the first oil supply passages 63a and 63b is in communication with each of the first oil discharge passages 65a and 65b formed within the first shaft 51. The second shaft 55 has the second oil supply passages 67a and 67b formed inside of it, and each of the second oil supply passages is in communication with each of the second discharge passages 69a and 69b formed within the second housing 57.

Since the inner circumferential surface of the first housing 53, which is tangential to the outer circumferential surface, is formed between its first oil supply passages 63a and 63b mentioned above with the sealing slots 71a and 71b and the sealing members 73a and 73b are inserted in the sealing slots 71a' and 71b, the sealing action can be performed between each of the first oil supply passages 63a and 63b.

In the same manner, since the inner circumferential surface of the second housing, which is tangential to the outer circumferential surface, is formed between its second oil discharge passages 69a and 69b mentioned above with the sealing slots 75a and 75b and the sealing member 77a and 77b are inserted in the sealing slots 75a and 75b, the sealing action can be performed between each of the second oil discharge passages 69a and 69b.

The hydraulic turning joint of this embodiment constructed as mentioned above is composed of a dual shaft and a housing, and since the oil passage to supply an oil between the upper and the lower frames are distributed in the dual shaft and the housing, the entire length will be substantially reduced with equal numbers of oil passages. Furthermore, the above mentioned first oil supply passages 63 and 63b and second oil supply passages 67a and 67b can supply different pressurized oil through the first oil discharge passages 65a and 65b, and the second oil discharge passages 69a and 69b respectively, and can use oil and air at the same time. That is, for example, the first supply passages 63a and 63b and the first discharge passages 65a and 65b can be used for providing off, while the second supply passages 67a and 67b and the second discharge passages can be used for providing air simultaneously.

As explained above, the hydraulic turning joint of the present invention can reduce its length with equal numbers of the oil passages therein as a conventional hydraulic turning joint and can improve the finishing of the inner surface of the housing. As a result, the hydraulic turning joint can have a profitable mounting space within the equipment and can improve the accuracy and the performance of the product. Particularly, the improved accuracy ensures the sealing action between each of the oil passages. Furthermore, it is possible to use oil and air at the same time with the separated dual turning joint.

What is claimed is:

1. A hydraulic turning joint adapted for rotatably jointing an upper frame relative to a lower frame and for enabling an oil flow between said upper and lower frames, the hydraulic turning joint comprising:

a first turning joint including a first shaft coupled to said upper frame, a first housing coupled to said lower frame, said first housing accommodating said first shaft rotatably and closely, a plurality of first oil supply passages formed in said first housing, and a plurality of first oil discharge passages formed in said first shaft, and first means for sealing said first oil supply passages for correspondingly communicating with said first oil discharge passages; and a second turning joint including a second shaft coupled to said first housing and accommodating said first housing closely therein, a second housing coupled to said first shaft and accommodating said second shaft rotatably and closely therein, a plurality of second oil supply passages formed in said second shaft, and a plurality of second oil discharge passages formed in said second housing, and second means for sealing said second oil supply passages for correspondingly communicating with said second oil discharge passages.

2. A hydraulic turning joint as claimed in claim 1, wherein said first means for sealing comprises groove means with a seal therein between said first oil supply passages within said first housing.

3. A hydraulic turning joint as claimed in claim 1 or 2, wherein said second means for sealing comprises groove means with a seal therein comprising another sealing means installed between the second oil discharge passages within said second housing.

4. A hydraulic turning joint as claimed in claim 1 wherein said oil discharge and said oil supply passages in said first shaft, said first housing and said second shaft include a longitudinal portion disposed along the longitudinal axis of the turning joint and a transverse portion disposed transverse to said longitudinal axis.

5. A hydraulic turning joint as claimed in claim 4 wherein said oil supply passages in said second shaft comprise two passages whose longitudinal portions are disposed at differing distances from the longitudinal axis of the turning joint.

* * * * *